United States Patent [19]

Miller, Sr.

[11] Patent Number: 5,580,208

[45] Date of Patent: Dec. 3, 1996

[54] TRACTOR THREE-POINT HITCH MOUNTED TRANSPORTER

[76] Inventor: Larry A. Miller, Sr., 4691 Wildwood Rd., Alger, Mich. 48610

[21] Appl. No.: 495,177

[22] Filed: Jun. 27, 1995

[51] Int. Cl.⁶ ..................................................... E02F 3/43
[52] U.S. Cl. ............................................ 414/703; 414/920
[58] Field of Search ...................................... 414/703, 920, 414/723, 722, 725; 37/403, 468

[56] References Cited

U.S. PATENT DOCUMENTS

| | | |
|---|---|---|
| 2,638,237 | 5/1953 | Struthers et al. . |
| 3,187,912 | 6/1965 | McKnight . |
| 3,468,442 | 9/1969 | Sarvela et al. . |
| 3,851,780 | 12/1974 | Martin . |
| 4,042,141 | 8/1977 | Schweigert . |
| 4,103,796 | 8/1978 | Hare . |
| 4,114,770 | 9/1978 | Jordan et al. ............... 414/703 X |
| 4,358,241 | 11/1982 | Anderson . |
| 4,725,189 | 2/1988 | Langenfeld et al. . |
| 4,770,595 | 9/1988 | Thompson et al. ................ 414/703 |
| 4,859,130 | 8/1989 | Langenfeld ...................... 414/703 |

OTHER PUBLICATIONS

Massey Ferguson Brochure one page.
Massey Ferguson Catalog pp. 427, 428, 447, 448, 453, 454.

*Primary Examiner*—Donald W. Underwood
*Attorney, Agent, or Firm*—Learman & McCulloch

[57] ABSTRACT

The transporter 10 has a frame 32 with an upper tube 36 and a lower tube 38 connected together by side plates 40 and 42 with integral support arms 48 and 50. A container pivot axis 52 passes through the rear ends of the support arms 58 and 50. Lower draft link attaching brackets 58 and 64 and upper draft link attaching brackets 68 are attached to the frame 32. A transport container 114 and Clevis plates 76 and 78 are pivotally attached to the support arms 48 and 50 by bolts 80 and 82. Hydraulic cylinders 98 and 108 are attached to the frame 32 and the clevis plates 76 and 78 to pivot the Clevis plates about the container pivot axis. Bolts 134 and 136 attach the Clevis plates to the container 114. The bolts 134 and 136 can be shear bolts.

15 Claims, 2 Drawing Sheets

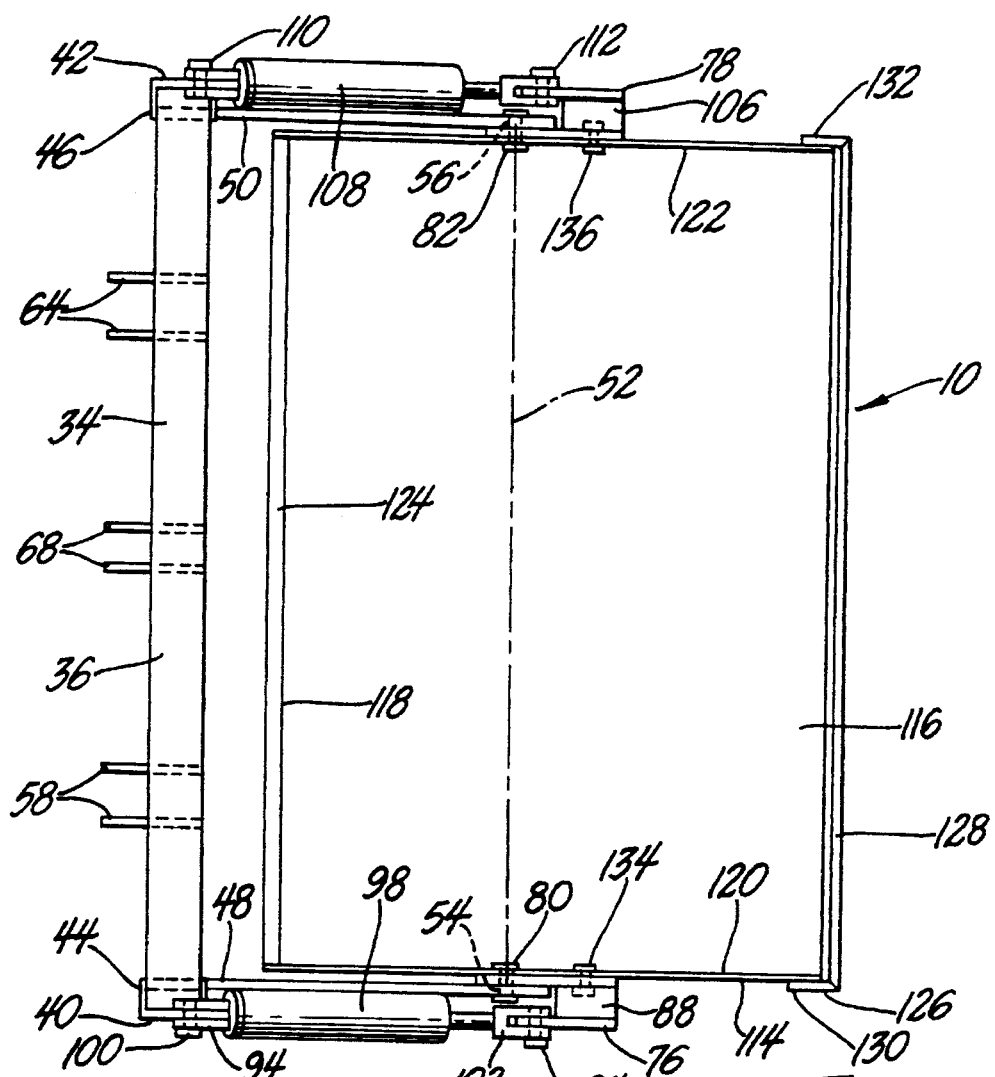

5,580,208

TRACTOR THREE-POINT HITCH MOUNTED TRANSPORTER

This invention relates to a transporter for transporting heavy and bulky articles and materials and, more particularly, to a tractor three-point hitch mounted transporter with a transporter container that is hydraulically tiltable.

BACKGROUND OF THE INVENTION

Harry Ferguson obtained a patent on an agricultural tractor three-point hitch before 1930. Today, a hydraulically controlled three-point hitch with two lower draft links and an upper draft link is standard equipment on most agricultural tractors made or is available as an option. A variety of transporters have been designed and used that are attached to standard three-point linkages. These transporters include units designed for transporting articles that are or may be loaded manually, as well as units designed for excavating.

The transporters for transporting articles that may be loaded manually have a variety of different designs. The simplest transporters have a flat platform with an A-frame rigidly secured to its forward side. The three-point links attach to the A-frame and can raise the platform from the ground for movement and can lower the platform to the ground for loading and unloading. The flat platform can be loaded and unloaded from the rear edge or from either side. Side walls can be provided to keep transported articles from falling off. The sides are removable in some designs, and fixed in others. A common arrangement is a flat platform with a front wall, two side walls, and an open rear. A flat platform with sides is pivotally attached to the A-frame in an integral platform support structure in some designs. The pivotal attachment allows the platform to be tilted for unloading.

The three-point mounted hitch buckets designed for excavating also vary in design. The least complicated design includes an excavator bucket pivotally mounted on a frame and having a bottom wall, side walls and a rear wall. The bucket is filled by moving the tractor forward and lowering the bucket to the ground with the three-point linkage control system. The bucket is dumped by gravity when it is raised by the three-point hitch and a mechanical release mechanism is released. The bucket is returned to a digging position by manipulating the three-point hitch and the tractor. The more sophisticated three-point hitch mounted excavating buckets are mounted on a boom that is pivotally attached to a mounting frame supported by the three-point hitch linkage. The boom is moved relative to the mounting frame by a hydraulic cylinder and the excavating bucket is moved relative to the boom by a hydraulic cylinder. Excavating buckets are generally too small to carry bulky material. The excavating buckets that are filled by moving the tractor forward generally have bucket support frame members that partially cover the bucket, making it difficult or impossible to manually load the bucket with bulky articles.

SUMMARY OF THE INVENTION

An object of the invention is to provide a rugged tractor three-point hitch mounted transporter that can transport relatively large loads over rough terrain;

another object of the invention is to provide a tractor three-point hitch mounted transporter with a pivotally mounted transporter container that is pivoted by a hydraulic linear actuator;

a further object of the invention is to provide a transporter container that can be loaded by moving the tractor to the rear with the transporter container lowered;

a still further object of the invention is to provide a transporter container that can be pivoted to a position in which the rear edge of the container floor can be used as a scraper; and a yet still further object of the invention is to provide a tractor three-point hitch mounted transporter with a plate that is pivoted about a transporter container pivot axis by a hydraulic cylinder in a transporter container that is pivoted by the plate.

The transporter has a frame with a transversely extending forward portion, support arms extending rearwardly from the ends of the forward portion, an upper draft link attaching bracket secured to the forward portion and a pair of lower draft link attaching brackets secured to the forward portion. A horizontal transverse transport container pivot axis passes through a rear portion of the two support arms. Clevis plates are pivotally attached to the support arms for pivotal movement about the transporter container pivot axis. A hydraulic cylinder is pivotally attached to each end of the transversely extending forward portion of the frame and to a Clevis bracket. A transporter container with a bottom wall, two side walls and a front wall has center portions of the side walls pivotally attached to the support arms for pivotal movement about the transporter container pivot axis. Mechanical fasteners connect the transporter container to the Clevis plate so that the container pivots with a Clevis plate.

The foregoing and other objects, features, and advantages of the present invention will become apparent in the light of the following detailed description of exemplary embodiments thereof, as illustrated in the accompanying drawing.

THE DRAWINGS

The presently preferred embodiment of the invention is disclosed in the following description and in the accompanying drawings, wherein:

FIG. 4 is a top plan view of the transporter; and

FIG. 5 is a left side elevational view of the transporter.

DETAILED DESCRIPTION

Figure 1:
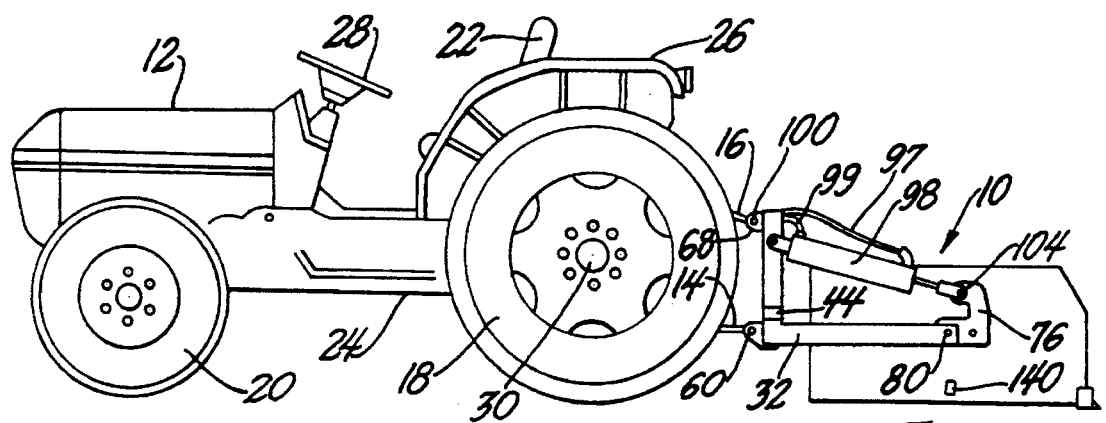
FIG. 1 is a side elevational view of a tractor with a transporter attached to the tractor three-point hitch and in a lowered position for loading.
Figure 2:
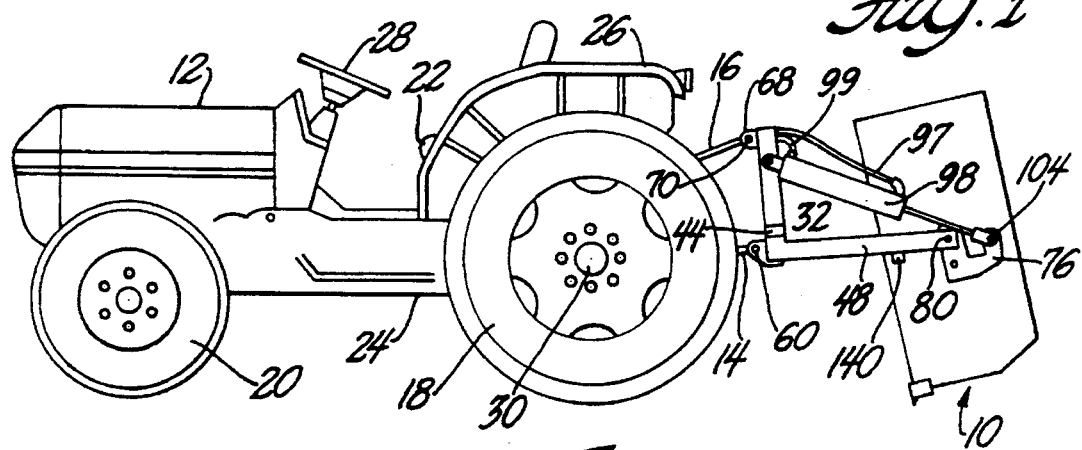
FIG. 2 is a side elevational view of the tractor and attached transporter with the transporter container pivoted to a position for discharging contents or for scraping a trail or other surface.

The transporter generally designated by the reference number 10 is shown in FIGS. 1 and 2 connected to an agricultural tractor 12 by two lower draft links 14 and an upper draft link 16. The tractor 12 has two driven rear wheels 18 and steerable front wheels 20. The seat 22 for an operator is mounted on the tractor above the transmission and axle housing assembly 24 and between the rear wheel fenders 26. A steering wheel 28 and other controls are positioned in convenient locations adjacent to the operator's seat 22. The forward ends of the lower draft links 14 are pivotally attached to the transmission and axle housing assembly 24 below the axles 30. An internal hydraulic system in the tractor 12 and a linkage system connected to the lower draft links 14 raise and lower the draft links and implements connected to the trailing ends of the lower draft links.

The transporter 10 includes a frame assembly 32. The frame assembly 32 includes a front portion 34 with a horizontal, transverse, rectangular upper tube 36 and a horizontal, transverse, rectangular lower tube 38. The upper tube 36 is longer than the lower tube 38. The ends of the upper and lower tubes 36 and 38 are connected by a left side plate 40 and a right side plate 42 that are welded to the ends of the tubes. To accommodate the shorter length of the lower tube 38, the side plate 40 has an angled section 44 that provides an offset and the side plate 42 has an angled section 46 that provides an offset. The left side support arm 48 is integral with the left side plate 40 and extends rearwardly from the lower portion of the side plate and the lower tube 38. A right side support arm 50 is integral with the right side plate 42 and extends rearwardly from the lower portion of the side plate and the lower tube 38. A horizontal transverse transport container pivot axis 52 passes through the center of a bore 54 through the trailing end of the support arm 48 and the center of a bore 56 through the trailing end of the support arm 50.

A pair of left side lower draft link attaching brackets 58 are welded to the left portion of the lower tube 38. A pin 60 that passes through aperture 62 through the attaching bracket 58 and pivotally attaches the left lower draft link 14 to the frame assembly 32 between the two attaching brackets. A pair of right side lower draft link attaching brackets 64 are welded to the right portion of the lower tube 38. A pin 60, that passes through aperture 66 through the attaching brackets 64, pivotally attaches the right lower draft link 14 to the frame assembly 32 between the two attaching brackets. A pair of upper draft link attaching brackets 68 are welded to the center of the upper tube 36. A pin 70, that passes through the aperture 72 through the attaching brackets 68, pivotally attaches the upper draft link 16 to frame assembly 32 between the upper draft link attaching brackets. The horizontal space between the left side lower draft link attaching brackets 58 and the right side lower draft link attaching brackets 64 is specified by engineering standards followed by most tractor manufacturers. The vertical distance between the lower draft link attaching brackets 58 and 64 and the upper draft link attaching brackets 68, as well as the size of the pins 60 and 70 are also controlled by engineering standards. Tractors have different categories of three-point hitches, depending upon their available power. The dimensions of the attaching points and the pins changes for each category. The frame assembly 32 could be provided with draft link attaching brackets that would accommodate two different hitch categories.

The left Clevis plate 76 is pivotally attached to the left side support arm 48 for pivotal movement about the container pivot axis 52. The right Clevis plate 78 is pivotally attached to the right side support arm 50 for pivotal movement about the container pivot axis 52. As shown in FIGS. 1, 2, and 4, a bolt 80 forms the pivotal connection between the left support arm 48 and the left Clevis plate 76. A bolt 82, shown in FIG. 4, forms the pivotal connection between the right side support arm 50 and the right Clevis plate 78.

Figure 3:
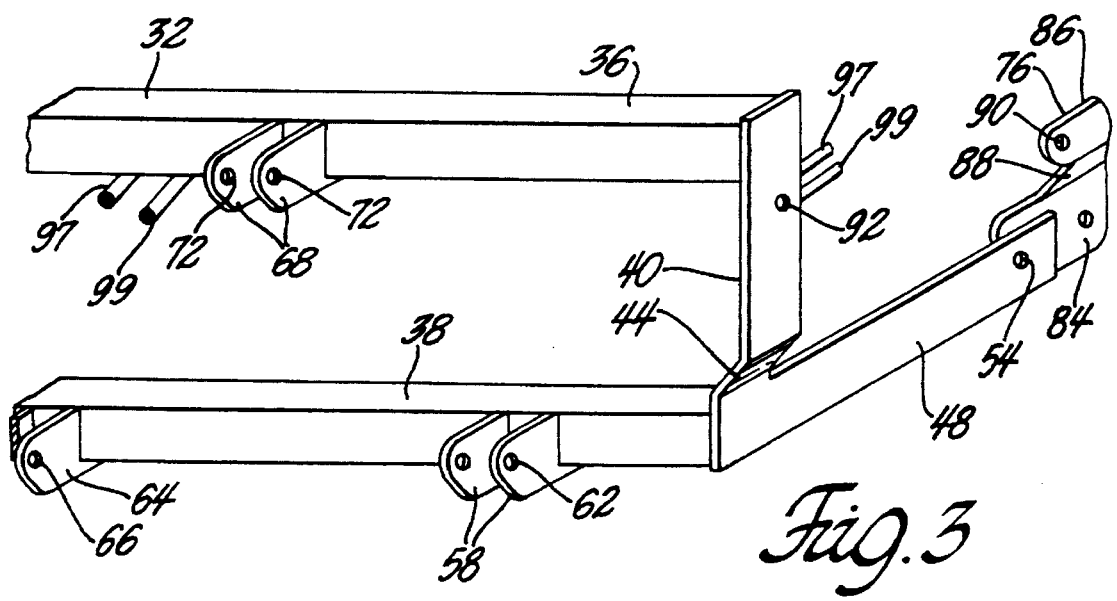
FIG. 3 is an enlarged, perspective view of the transporter frame and Clevis plate with the right side broken away.

The left Clevis plate 76 has an inboard portion 84 in a generally vertical plane and an outboard portion 86 in a parallel vertical plane. The inboard portion 84 is joined to the outboard portion 86 by an integral, angled offset portion 88. The outboard portion 86 has an aperture 90 that is radially spaced from the container pivot axis 52 and that is in fore and aft alignment with an aperture 92 in the upper portion of the left side plate 40 between the upper tube 36 and the angled section 44. A Clevis 94 on the cylinder barrel 96 of a hydraulic cylinder 98 receives the trailing edge of the left side plate 40. A pivot pin 100 passes through the Clevis 94 and the aperture 92 to pivotally attach the hydraulic cylinder 98 to the frame assembly 32. A rod end Clevis 102 on the hydraulic cylinder 98 receives a forward edge of the outboard portion 86 of the left Clevis plate 76. A pivot pin 104 passes through the rod end Clevis 102 and the aperture 90 in the outboard portion 86 to pivotally attach the hydraulic cylinder 98 to the left Clevis plate 76. The right Clevis plate 78 is identical to the left Clevis plate 76, except that it includes an integral angled offset portion 106 that is angled in the opposite direction from the angled offset portion 88 of the left Clevis plate 76. The hydraulic cylinder 108 is identical to the hydraulic cylinder 98. A pivot pin 110 pivotally attaches the cylinder end to the right side plate 42 and a pivot pin 112 pivotally attaches the rod end of the hydraulic cylinder 108 to the right Clevis plate 78. The hydraulic cylinders 98 and 108 are double acting cylinders that are connected to the hydraulic system of a tractor 12 in parallel. The head end and the rod end of each hydraulic cylinder 98 or 108 are connected to the tractor hydraulic system by pressure pipes 97 and 99 that are shown in FIGS. 2 and 3 only. The Clevises 94 and 102, as described above and as shown in the drawing, are on the hydraulic cylinders 98 and 108. If desired, one or both Clevises could be on the frame assembly 32 and/or the Clevis plates 76 and 78.

A transport container 114 includes a flat floor 116, a front wall 118, a left side wall 120 and a right side wall 122. The walls and the floor are all heavy gauge steel that is welded where required. Preferably, at least the floor 116 and the front wall 118 are one piece with a 90° bend. A lip 124 is formed on the top edge of the front wall 118 for reinforcement. A flat bar 126 with a beveled rear upper edge 128 is positioned under the trailing edge of the floor 116 and welded in place. The ends 130 and 132 of the flat bar 126 are bent 90° upward against the outside surface of the left and right side walls 120 and 122. Preferably the ends 130 and 132 of the flat bar 126 extend upward a few inches and are welded to the left and right side walls 120 and 122. The beveled surface 128 provides a cutting edge that assists in loading material into the transport container 114.

A bore is provided through the center portion of both side walls 120 and 122. The bolt 80 passes through the bore through the center portion of the left side wall 122 and pivotally attaches the left side wall to the left support arm 48. The bolt 82 passes through the bore through the center portion of the right side wall 122 and pivotally attaches the right side wall to the right support arm 50. The transport container 114 is, thereby, pivotally mounted for pivot movement about the container pivot axis 52.

A bolt 134 passes through the left Clevis plate 76 and the left side wall 120 at a point radially spaced from the container pivot axis 52. A bolt 136 passes through the right Clevis plate 78 and the right side wall 122 at a point radially spaced from the container pivot axis 52. The bolts 134 and 136 transfer torque from the Clevis plates 76 and 78 to the transport container 114 to rotate the container about the container pivot axis 52 or to prevent the container from rotating about the container pivot axis. The bolts 134 and 136 can be shear bolts, if desired, that will shear and allow the transport container 114 to pivot free from the Clevis plates 76 and 78 about the container pivot axis 52. Shear bolts can prevent overloads and damage to the transporter 10.

The hydraulic cylinders 98 and 108 can rotate the Clevis plates 76 and 78 clockwise about 80° from the position shown in FIGS. 1 and 5. The hydraulic cylinders 98 and 108 can also rotate the Clevis plates 76 and 78 about 20° counterclockwise from the position shown in FIGS. 1 and 5. The 20° counterclockwise rotation is sufficient to keep material from falling from the open rear of the transport container 114 when the tractor 12 is traveling up a hill. The 80° clockwise rotation moves stops 140 on the sidewalls 120 and 122 into contact with the support arms 48 and 50, as shown in FIG. 2. In this position, the flat bar 126 can act as a scraper to move material forward or rearward. The scraper action of the flat bar 26 is especially useful for improving a trail before a heavy load is transported along the trail in the transport container 114.

The bolts 80 and 82 pivotally connect the left Clevis plate 76, the right Clevis plate 78, the left side wall 120 and the right side wall 122 to the left side support arm 48 and the right side support arm 50. Other structure could be used in place of the bolts 80 and 82. The bolts 80 and 82 could be replaced by spindles secured to the support arms 48 and 50. Such spindles could be fixed or rotatable. Alternatively, fixed or rotatable spindles could be attached to the side walls 120 and 122. Securing spindles to the side support arms 48 and 50 or to the side walls 120 and 122 would tend to hold the spindles in positions concentric with the container pivot axis 152. The Clevis plates 76 and 78 could be on either side of the support arms 48 and 50. With the Clevis plates 76 and 78 on the outboard side of the support arms 48 and 50, spindles could be secured to the Clevis plates. With the Clevis plates 76 and 78 in different positions relative to the support arms 48 and 50, the angled offset portions 88 and 106 would have to be changed slightly for the hydraulic cylinders 98 and 108 to exert force in planes perpendicular to the container pivot axis 52.

The draft links 14 and 16 can lower the flat floor 116 of the transport container 114 to the ground and the hydraulic cylinders 98 and 108 can level the flat floor from front to rear for loading. The transport container 114 can be loaded manually with products such as firewood, grain sacks, or other materials that will fit in the transport container. Once the transport container 114 is loaded, it can be lifted to just clear the ground and transported with all the weight on the tractor rear axles 30 and close to the ground for stability.

The transport container 114 can also be loaded by lowering the flat bar 126 to contact with material to be loaded and then backing the tractor up to force the material into the transport container. When force loading the transport container 114 by backing the tractor up, the hydraulic cylinders 98 and 108, as well as the support arms 48 and 50, may force the transport container into the material to be loaded, thereby reducing the load on the bolts 80 and 82. This occurs because the support arms 48 and 50 apply force to the rear in a generally horizontal direction and the hydraulic cylinders 98 and 108 apply force to the rear and slightly downward.

Preferred embodiments of the invention have been described in detail, but are examples only and the invention is not restricted thereto. It will be easily understood by those skilled in the art that modifications and variations can easily be made within the scope of this invention.

I claim:

1. A transporter mountable on a tractor three-point linkage comprising:

a frame having a transversely extending forward portion, a left support arm integral with and extending rearwardly from a left end of the forward portion and a right support arm integral with and extending rearward from a right end of the forward portion;

a generally horizontal transverse transporter container pivot axis passing through a rear portion of the left support arm and passing through a rear portion of the right support arm;

a left side Clevis plate pivotally attached to the left support arm for pivotal movement about the transporter container pivot axis;

a right side Clevis plate pivotally attached to the right support arm for pivotal movement about the transporter container pivot axis;

a left side hydraulic cylinder pivotally attached to the frame and to the left side Clevis plate at a point radially spaced from the transport container pivot axis;

a right side hydraulic cylinder pivotally attached to the frame and to the right side Clevis plate at a point radially spaced from the transporter pivot axis;

a transporter container having a left side wall, a right side wall, a front wall integral with the left side wall and the right side wall and a bottom wall integral with the front wall, the left side wall and the right side wall;

the left side wall pivotally attached to the left support arm for pivotal movement about the transporter container pivot axis;

the right side wall pivotally attached to the right support arm for pivotal movement about the transporter container pivot axis;

a left side mechanical fastener connecting the left side Clevis plate to the transporter container at a point spaced from the transporter container pivot axis;

a right side mechanical fastener connecting the right side Clevis plate to the transporter container at a point spaced from the transporter container pivot axis;

an upper draft link attaching bracket secured to the transversely extending forward portion of the frame; and a pair of lower draft link attaching brackets secured to the transversely extending forward portion of the frame.

2. A transporter, as set forth in claim 1, wherein the left side Clevis plate includes an inboard portion that is adjacent to an outboard surface of the left side wall and includes an outboard portion that is spaced from the left side wall; and the right side Clevis plat includes an inboard portion that is adjacent to an outboard surface of the right side wall and includes an outboard portion that is spaced from the right side wall.

3. A transporter, as set forth in claim 2, wherein the inboard portion of the left side Clevis plate is positioned between the left support arm and the left side wall and the left side hydraulic cylinder is pivotally attached to the outboard portion of the left side Clevis plate; and wherein the inboard portion of the right side Clevis plate is positioned between the right support arm and the right side wall and the left side hydraulic cylinder is pivotally attached to the outboard portion of the left side Clevis plate.

4. A transporter, as set forth in claim 3, wherein the left side hydraulic cylinder is above the left support arm and the right side hydraulic cylinder is above the right support arm.

5. A transporter, as set forth in claim 3, wherein the inboard portion and the outboard portion of each Clevis plate are connected together by an integral angled offset portion.

6. A transporter, as set forth in claim 1, wherein the left and right side mechanical fastener connecting the Clevis plates to the transporter container are shear bolts.

7. A transporter, as set forth in claim 1, wherein the transporter container pivot axis passes through a center portion of the left and right side walls.

8. A transporter, as set forth in claim 1, including a flat bar with a beveled edge attached to a rear edge of the transporter container floor.

9. A transporter, as set forth in claim 8, wherein the flat bar with a beveled edge has upturned ends that are attached to the container side walls.

10. A transporter, as set forth in claim 1 including a stop secured to the transporter container side wall that contacts one of the support arms to limit pivotal movement of the transporter container about the container pivot axis.

11. A transporter mountable on a tractor three-point linkage comprising:
- a frame having a transversely extending forward portion, a left support arm integral with and extending rearwardly from a left end of the forward portion and a right support arm integral with and extending rearward from a right end of the forward portion;
- a generally horizontal transverse transporter container pivot axis passing through a rear portion of the left support arm and passing through a rear portion of the right support arm;
- a Clevis plate pivotally attached to one of the support arms for pivotal movement about the transporter container pivot axis;
- a hydraulic cylinder pivotally attached to the frame and to the Clevis plate at a point radially spaced from the transport container pivot axis;
- a transporter container having a left side wall, a right side wall, a front wall integral with the left side wall and the right side wall and a bottom wall integral with the front wall, the left side wall and the right side wall;
- the left side wall pivotally attached to the left support arm for pivotal movement about the transporter container pivot axis;
- the right side wall pivotally attached to the right support arm for pivotal movement about the transporter container pivot axis;
- a mechanical fastener connecting the Clevis plate to the transporter container at a point spaced from the transporter container pivot axis;
- an upper draft link attaching bracket secured to the transversely extending forward portion of the frame; and
- a pair of lower draft link attaching brackets secured to the transversely extending forward portion of the frame.

12. A transporter, as set forth in claim 11, wherein the Clevis plate includes an inboard portion that is positioned between one of the support arms and an adjacent side wall of the transporter container.

13. A transporter as set forth in claim 11 wherein the Clevis plate includes an outboard portion and the hydraulic cylinder is pivotally attached to the outboard portion of the Clevis plate.

14. A transporter, as set forth in claim 13, wherein the inboard portion and the outboard portion of the Clevis plate are connected together by an integral angled offset portion.

15. A transporter, as set forth in claim 11 including a stop secured to one of the transporter container side walls that contacts one of the support arms to limit pivotal movement of the transporter container about the container pivot axis.

* * * * *